(12) United States Patent
Chang et al.

(10) Patent No.: US 7,154,643 B2
(45) Date of Patent: Dec. 26, 2006

(54) LINEAR GUIDING APPARATUS

(76) Inventors: Heng-Hsiang Chang, No. 211, Junghe St., Shi Chiu, Tainan, 703 (TW); Chin-Chung Lien, 2F, No. 2, Alley 1, Lane 109, Hsiufeng Rd., Hsichih, Taipei Hsien (TW)

( * ) Notice: Subject to any disclaimer, the term of this patent is extended or adjusted under 35 U.S.C. 154(b) by 849 days.

(21) Appl. No.: 10/065,171

(22) Filed: Sep. 24, 2002

(65) Prior Publication Data

US 2004/0055411 A1   Mar. 25, 2004

(51) Int. Cl.
 *H04N 1/04* (2006.01)
(52) U.S. Cl. .................. 358/497; 358/474; 358/471; 358/483
(58) Field of Classification Search ............. 358/497, 358/494, 474, 471, 400, 401, 482, 483, 487, 358/296, 505, 506, 512–514, 501, 500; 250/239, 250/234–236, 216, 208.1; 399/211, 212; 355/40, 41; 382/312, 318, 319
See application file for complete search history.

(56) References Cited

U.S. PATENT DOCUMENTS

| | | | | |
|---|---|---|---|---|
| 5,900,951 A * | 5/1999 | Tsai | ............... | 358/497 |
| 5,999,277 A * | 12/1999 | Tsai | ............... | 358/498 |
| 6,005,685 A * | 12/1999 | Tsai | ............... | 358/497 |
| 6,005,686 A * | 12/1999 | Hong | ............. | 358/497 |
| 6,771,399 B1 * | 8/2004 | Batten | ............ | 358/497 |
| 6,888,651 B1 * | 5/2005 | Lee | ............... | 358/497 |
| 7,016,088 B1 * | 3/2006 | Yokota et al. | ......... | 358/474 |

* cited by examiner

*Primary Examiner*—Cheukfan Lee
(74) *Attorney, Agent, or Firm*—Berkeley Law & Technology Group LLC (57) ABSTRACT

A guiding apparatus for a scanner may comprise a V-shaped supporting surface capable of supporting a body on a shaft, wherein the body comprises optical components. The guiding apparatus may also comprise an elastic member coupled to the body and capable of contacting the shaft and an adjusting member capable of adjusting the position of the elastic member.

23 Claims, 7 Drawing Sheets

LINEAR GUIDING APPARATUS

BACKGROUND OF INVENTION

1. Field of the Invention

The present invention relates in general to a linear guiding apparatus. More particularly, the invention relates to a linear guiding apparatus which may be utilized in scanners of different sizes and be suited to shafts of different diameters.

2. Description of the Related Art

As image input, process and finishing have evoked public interest, the optical scanner is now the basic equipment for many computer users. The optical scanner is used to scan the text or graphic information of a document, a magazine, a book or a picture. The scanned information is converted to a digital file and then input to the computer for further process. Of the various kinds of scanners, the flatbed scanner is very common. The scan module of the flatbed scanner is installed under a transparent platform to scan the document disposed on the transparent platform by iterative movement. The document is scanned to a digital image file for displaying, recognition, editing, saving or outputting.

The scan module includes a light source, lens, mirrors, CCD sensor and a chassis housing containing thereof. Because the CCD sensor is designed of a line type in one direction, the scan module interactively moves through the document in another direction during the scanning process. Therefore, the driving mechanism of a flatbed scanner is utilized, to move the scan module through a linear guiding apparatus. Then, the image is scanned to the CCD sensor line by line.

Figure 1A:
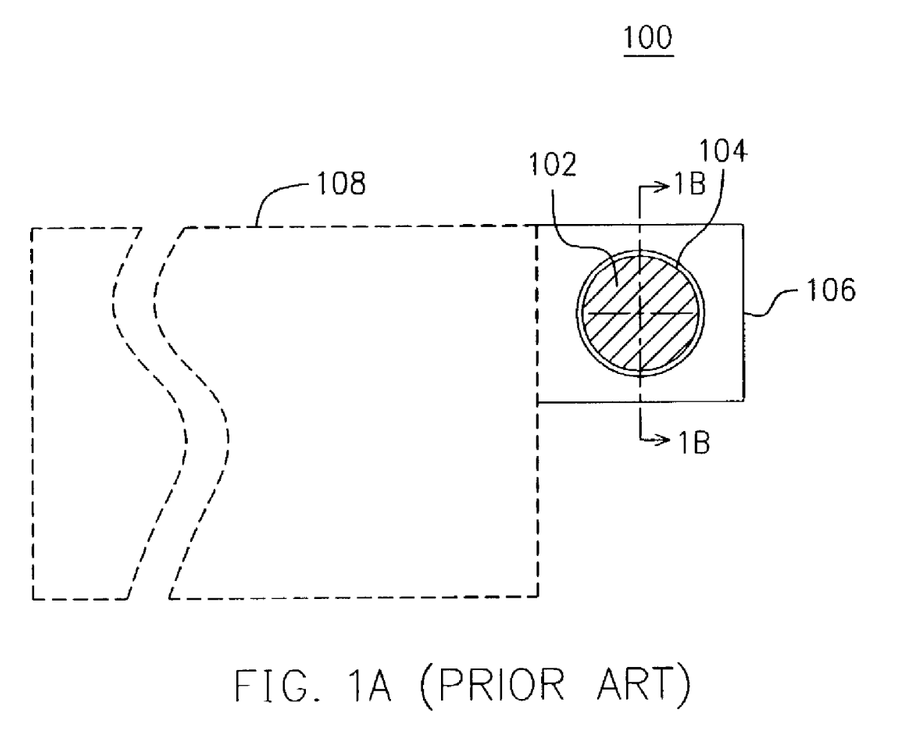
FIG. 1A is a front view of a conventional linear guiding apparatus for a flatbed scanner.
Figure 1B:
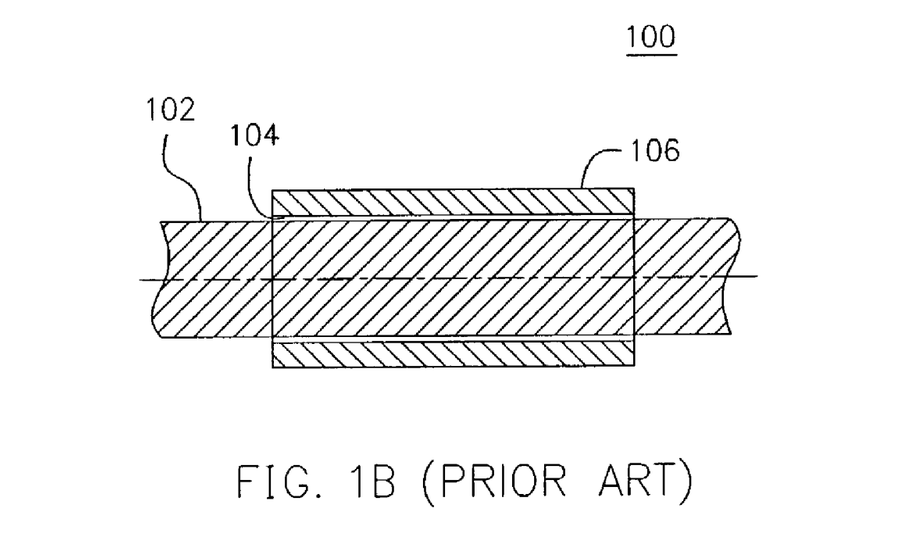
FIG. 1B is a sectional view corresponding to the cross section line 1B—1B of FIG. 1A.

FIG. 1A illustrates the front view of the linear guiding apparatus of a flatbed scanner. FIG. 1B illustrates the sectional view corresponding to the cross section line 1B—1B of FIG. 1A. Referring to FIG. 1A and FIG. 1B, the conventional linear guiding apparatus includes a sleeve 104 and a shaft 102 (the figures only shows a portion of the linear guiding apparatus). The sleeve 104 is located in the main body 106 of the linear guiding apparatus 100. The main body 106 can be formed integrally with the chassis housing 108 in a single body. The chassis housing 108 contains optical components and is located in the housing of the flatbed scanner. The sleeve 104 receives the shaft 102. Therefore, when the driving mechanism drives the chassis housing 108, the linear guiding apparatus 100 makes the chassis housing 108 move along the axis of the shaft 102.

The shaft 102 and the sleeve 104 of the linear guiding apparatus 100 must join tightly to ensure the moving direction of the chassis housing 108 straightly. Thus, the inner diameter of the sleeve 104 is designed to match the outer diameter of the shaft 102. However, the outer diameter of the shaft 102 for different style of the scanner is varied, the storage of various sleeves is necessary. Thus, the cost of the linear guiding apparatus is increased.

SUMMARY OF INVENTION

Accordingly, the present invention provides a linear guiding apparatus, which has a shaft holding apparatus being able to hold any shaft. Therefore, the linear guiding apparatus is adapted to various style of the scanner.

The present invention also provides a linear guiding apparatus which the manufacturing cost of the sleeve is decreased.

In order to achieve the objects set forth above, the present invention provides a linear guiding apparatus which at least has a shaft and a shaft holding apparatus. The shaft holding apparatus is adapted to slide along the shaft. The shaft holding apparatus includes a body, an elastic member and an adjusting member. The body has a V-shaped supporting surface, wherein the V-shaped supporting surface is along the axis direction of the shaft and supports on outer edge of the shaft. The elastic member is mounted on the body, wherein the elastic member is contacted the outer edge of the shaft, and the shaft is clipped between the elastic member and the V-shaped supporting surface. The adjusting member is mounted on the body and contacted the elastic member, wherein the adjusting member is utilized to adjust the position of the elastic member. Therefore, the shafts having different diameter may be clipped between the elastic member and the V-shaped supporting surface.

The present invention provides another linear guiding apparatus which at least has a shaft and a shaft holding apparatus. The shaft holding apparatus is adapted to slide along the shaft. The shaft holding apparatus includes a body, an elastic member and an adjusting member. The body has a V-shaped supporting surface, and the V-shaped supporting surface supports on outer edge of the shaft corresponding the axis direction of the shaft. The adjusting member is mounted on the body, and the elastic member is mounted on the adjusting member. The adjusting member is adapted to adjust the position of the elastic member. Then, the elastic member is contacted the outer edge of the shaft and clips the shaft with the V-shaped supporting surface. The elastic member and the V-shaped supporting surface are utilized to hold a shaft of any diameter.

Both the foregoing general description and the following detailed description are exemplary and explanatory only and are not restrictive of the invention, as claimed.

DETAILED DESCRIPTION

Figure 2A:
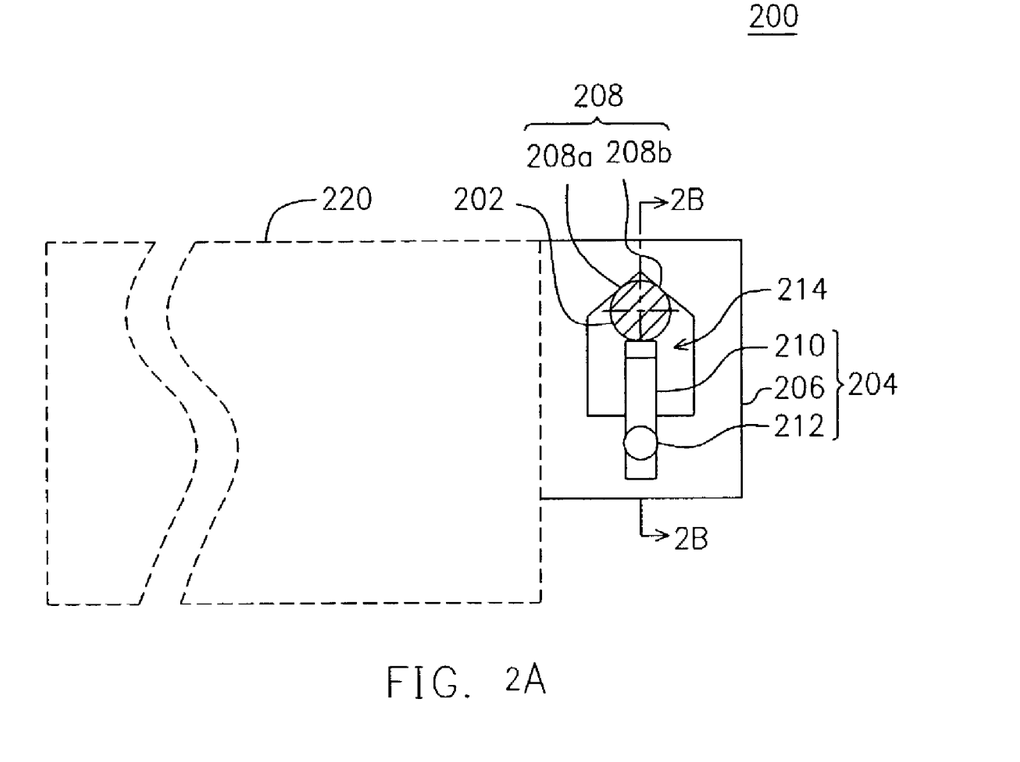
FIG. 2A is a front view of a linear guiding apparatus for a first embodiment of the present invention.
Figure 2B:
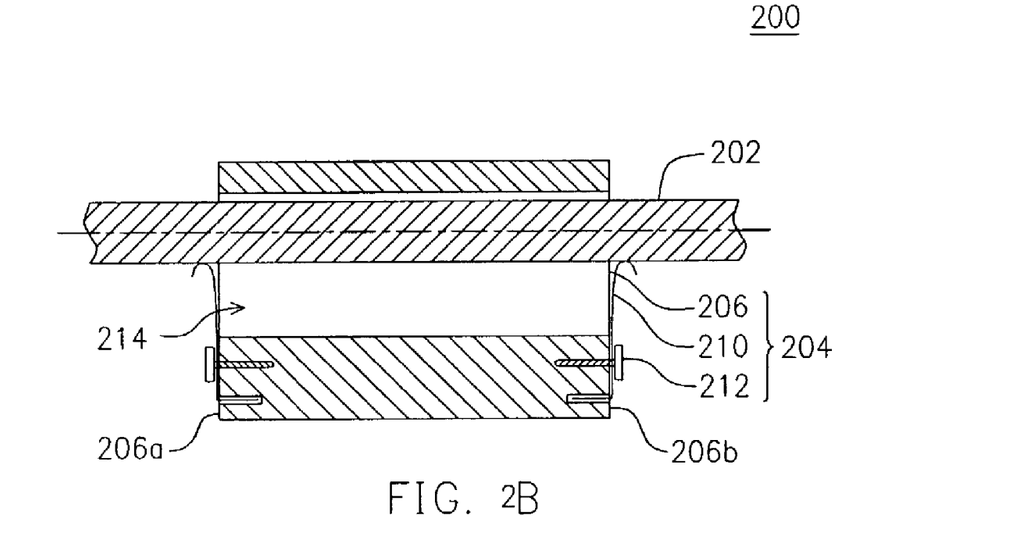
FIG. 2B is a sectional view corresponding to the cross section line 2B—2B of FIG. 2A.

FIG. 2A illustrates a front view of a linear guiding apparatus 200 for a first embodiment according to the present invention. FIG. 2B is a sectional view corresponding to the cross section line 2B—2B of FIG. 2A. The linear guiding apparatus 200 according this invention at least includes a shaft 202 and a shaft holding apparatus 204.

The shaft 202 is mounted in the housing of the scanner according to the moving direction of the chassis housing 220. That is, the axis of the shaft 202 is paralleled to the moving direction of the chassis housing 220.

The shaft holding apparatus 204 is mounted on the chassis housing 220, and is adapted to slide along the shaft 202. The shaft holding apparatus 204 includes a body 206, an elastic member 210 and an adjusting member 212.

The body 206 of the shaft holding apparatus 204 is mounted on the chassis housing 220, wherein the body 206 can be formed integrally with the chassis housing 220 in a single body. The body 206 has a V-shaped supporting surface 208 inside. The V-shaped supporting surface 208 is located in the body 206 corresponding to the axis of the shaft 202. The V-shaped supporting surface 208 has a first supporting surface 208a and a corresponding second supporting surface 208b. The first supporting surface 208a and the second supporting surface 208b support the outer edge of the shaft 202.

In this embodiment, the V-shape supporting surface 208 is formed on the inner surface of the through hole 214, wherein the through hole 214 is formed through the body 206 corresponding to the axis of the shaft 202. The V-shape supporting surface 208 (the first supporting surface 208a and the second supporting surface 208b) constructs a portion of the inner surface of the through hole 214. When the shaft 202 is inserted into the through hole 214 of the body 202, the first supporting surface 208a and the second supporting surface 208b support the shaft 202. In addition, the diameter of the through hole 214 is preferably enough large to receive a shaft of a larger diameter.

The elastic member 210 is mounted on the body 206, wherein the elastic member 210 is elastically contacted the outer edge of the shaft 202, and the shaft 212 is clipped between the elastic member 210 and the V-shape supporting surface 208. In this embodiment, the elastic member 210 consists of, for example, two leaf springs. The two leaf springs is fixed on the side-walls 206a, 206b of the body 206 respectively, wherein one ends of the two leaf springs are fixed on the side-wall 206a, 206b, the other ends are bent outwardly to contact the outer edge of the shaft 202. Therefore, the shaft 202 is firmly clipped in the shaft holding apparatus 204 by the first supporting surface 208a, the second supporting surface 208b and the leaf springs (the elastic member 210). Moreover, the material of the leaf springs is preferably of low friction coefficient. The friction between the shaft 202 and the leaf springs is respectively low, so the shaft 202 can slide smoothly in the shaft holding apparatus 204.

The adjusting member 212 is mounted on the body 206 and contacted the elastic member 210 to adjust the position of the elastic member 210. The position adjustment for the elastic member 210 corresponding to a shaft of a determined diameter provides a proper clipping force to the shaft. In this embodiment, the adjusting member is, for example, a screw. The screws fix the leaf springs on the side-walls 206a, 206b through the openings of the leaf springs (not shown) respectively.

When the adjusting member 212 is screwed into the side-walls 206a, 206b, the elastic member 210 (the leaf springs) is pushed to be close to the V-shape supporting surface 208. Then, the space between the V-shape supporting surface 208 and the elastic member 210 is getting smaller to receive a shaft of a smaller diameter. Oppositely, when the adjusting member 212 is unscrewed from the side-walls 206a, 206b, the elastic member 210 is distant from the V-shape supporting surface 208 by its own recovering force. Then, the space between the V-shape supporting surface 208 and the elastic member 210 is getting larger to receive a shaft of a longer diameter.

Figure 2C:
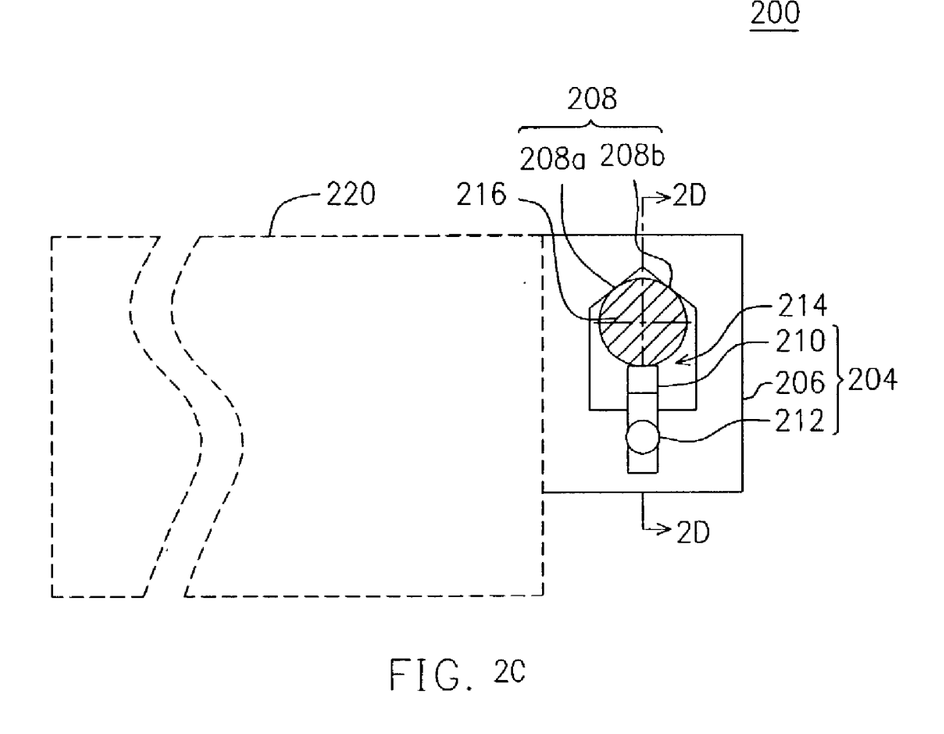
FIG. 2C is a front view of a linear guiding apparatus for a first embodiment of the present invention, wherein the linear guiding apparatus receives a shaft of a different diameter from that of the shaft of FIGS. 2A, 2B.
Figure 2D:
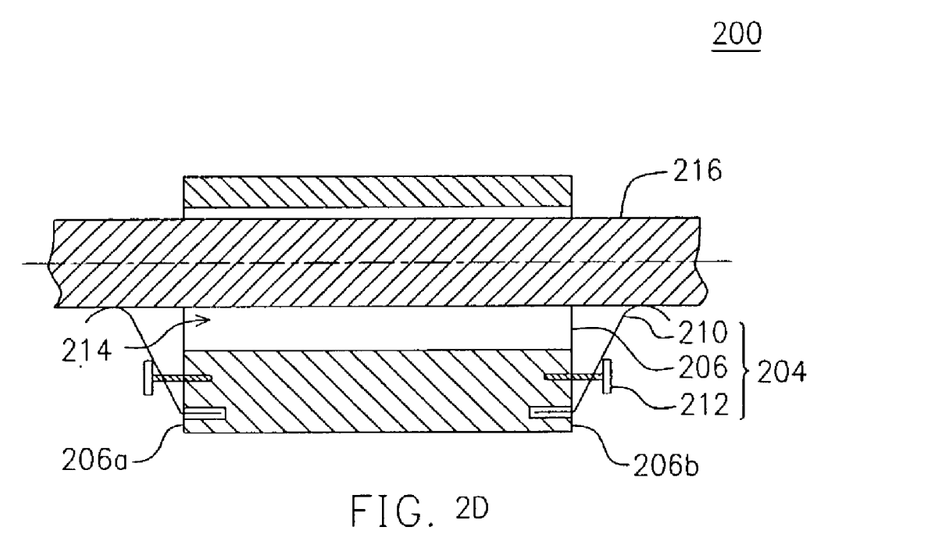
FIG. 2D is a sectional view corresponding to the cross section line 2D—2D of FIG. 2A.

FIG. 2C is a front view of a linear guiding apparatus 200 for a first embodiment of the present invention, wherein the linear guiding apparatus 200 receives a shaft of a different diameter from that of the shaft of FIGS. 2A, 2B. FIG. 2D is a sectional view corresponding to the cross section line 2D—2D of FIG. 2A. As shown in FIG. 2C, the diameter of the shaft 216 is longer than that of the shaft 202. Thus, when the linear guiding apparatus 200 is changed to receive the shaft 216, the adjusting member 212 is unscrewed form the body 206 to make the elastic member 210 distant from the V-shape supporting surface 208. Then, the space between the V-shape supporting surface 208 and the elastic member 210 is getting larger. The shaft 216 of a longer diameter is clipped between the V-shape supporting surface 208 and the elastic member 210 by adjusting the adjusting member properly.

Figure 3A:
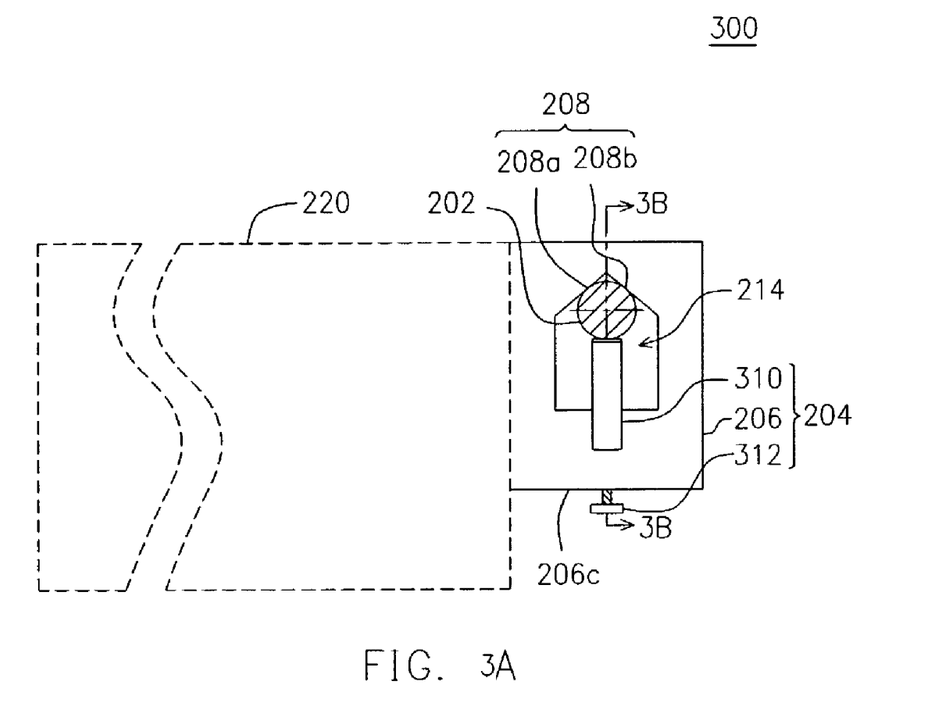
FIG. 3A is a front view of a linear guiding apparatus for a second embodiment of the present invention.
Figure 3B:
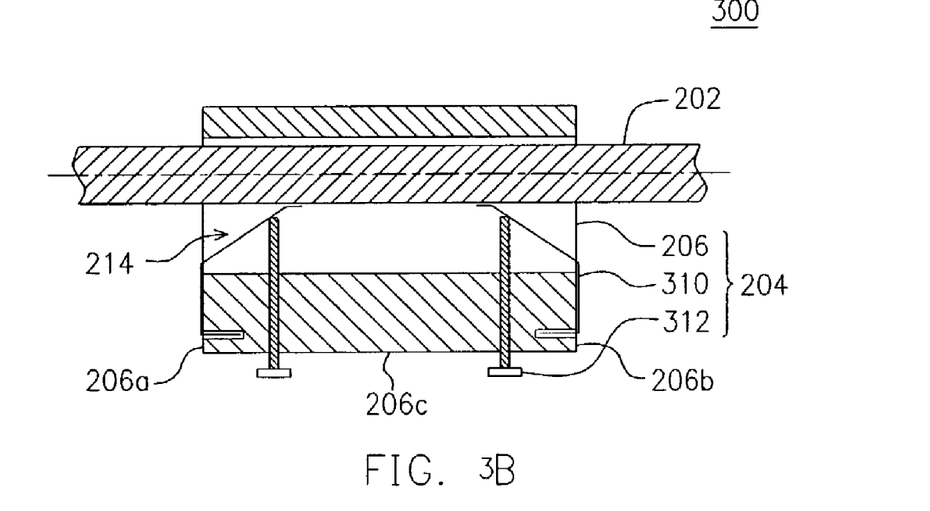
FIG. 3B is a sectional view corresponding to the cross section line 3B—3B of FIG. 3A.

Excepting the first embodiment mentioned above, there are several modified embodiments for the linear guiding apparatus of the present invention. FIG. 3A is a front view of a linear guiding apparatus for a second embodiment of the present invention. FIG. 3B is a sectional view corresponding to the cross section line 3B—3B of FIG. 3A. In FIGS. 3A, 3B, the components which are the same as those in FIGS. 2A, 2B will use the same symbols and the description about those is omitted.

In this embodiment, the elastic member 310 (for example, two leaf springs) is fixed on the two side-walls 206a, 206b of the body 206 on one ends, and is bent inward to the through hole 214 on the other ends respectively. One surface of the two leaf spring is contacted the outer edge of the shaft 202. Moreover, the material of the leaf springs is preferably of low friction coefficient. The friction between the shaft 202 and the leaf springs is respectively low, so the shaft 202 can slide smoothly in the shaft holding apparatus 204.

The adjusting member 312 is composed of, for example, two screws. The screws are fixed on the bottom surface 206c of the body 206, and the tips of the screws are inserted to the through hole 214 and contacted the leaf springs respectively.

When the adjusting member 312 is screwed into the bottom surface 206c, the elastic member 310 (the leaf springs) is pushed to be close to the V-shape supporting surface 208. Then, the space between the V-shape supporting surface 208 and the elastic member 310 is getting smaller to receive a shaft of a smaller diameter.

Oppositely, when the adjusting member 312 is unscrewed from the bottom surface 206c, the elastic member 310 is distant from the V-shape supporting surface 208 by its own recovering force. Then, the space between the V-shape supporting surface 208 and the elastic member 310 is getting larger to receive a shaft of a longer diameter.

Figure 4A:
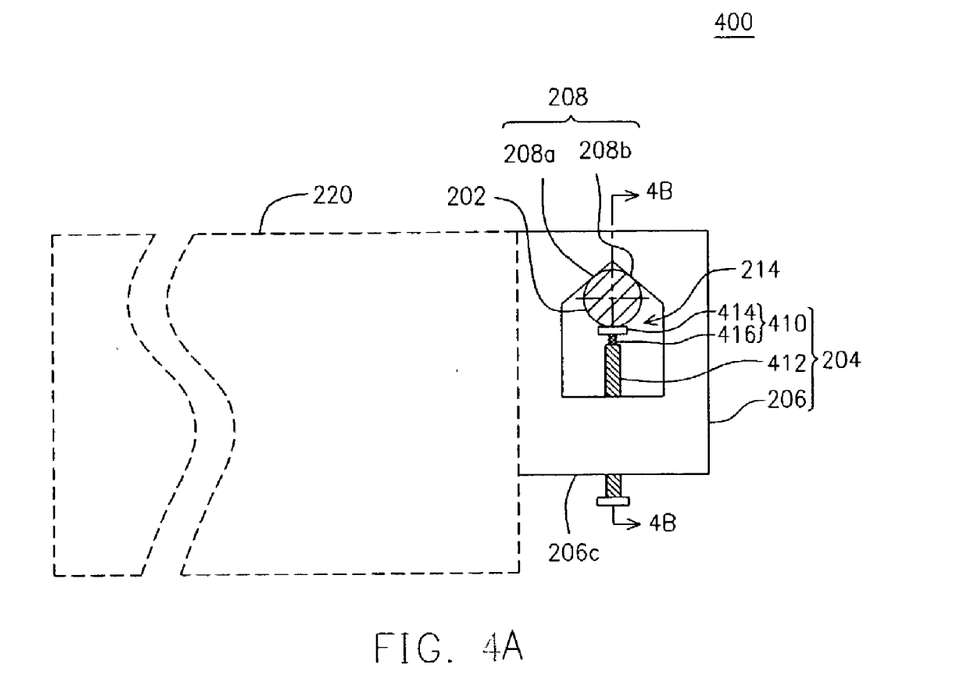
FIG. 4A is a front view of a linear guiding apparatus for a third embodiment of the present invention.
Figure 4B:
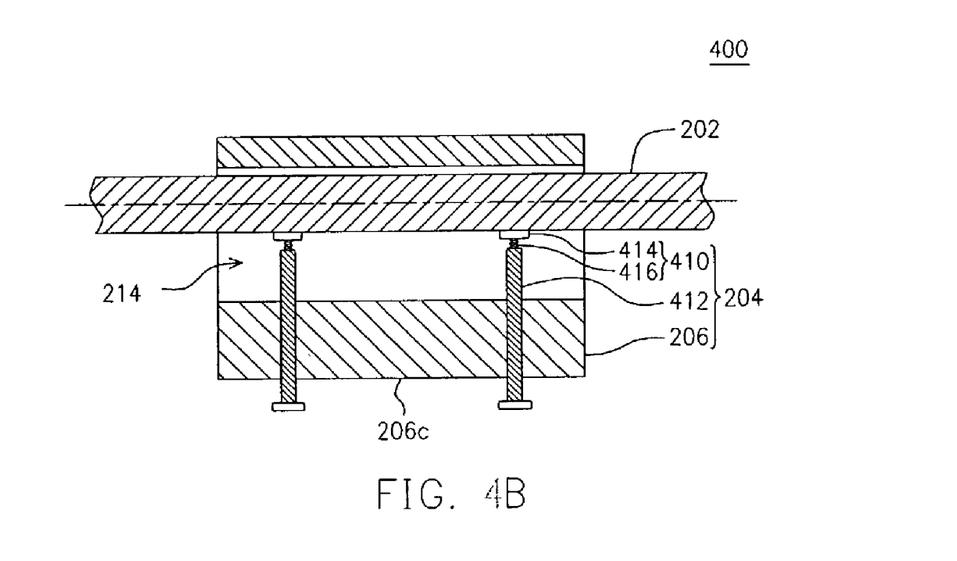
FIG. 4B is a sectional view corresponding to the cross section line 4B—4B of FIG. 4A.

FIG. 4A is a front view of a linear guiding apparatus for a third embodiment of the present invention. FIG. 4B is a sectional view corresponding to the cross section line 4B—4B of FIG. 4A. In FIGS. 4A, 4B, the components which are the same as those in FIGS. 2A, 2B will use the same symbols and the description about those components is omitted.

In this embodiment, the adjusting member 412 is composed of, for example, two screws. The screws are fixed on the bottom surface 206c of the body 206, and the tip of each of the screws has a blind hole (not shown) respectively. The elastic member 410 is composed of, for example, a washer 414 and a spring 416. The one side of the washer 414 has a leader, which is inserted into the blind hole of the adjusting member 412 through the spring 416. Thus, the other side of the washer 414 is contacted the outer edge of the shaft 202 elastically. Moreover, the material of the washer 414 is preferably of low friction coefficient. The friction between the shaft 202 and the washer 414 is respectively low, so the shaft 202 can slide smoothly in the shaft holding apparatus 204.

When the adjusting member 412 is screwed into the bottom surface 206c, the elastic member 410 (the washer 414 and the spring 416) is pushed to be close to the V-shape supporting surface 208. Then, the space between the V-shape supporting surface 208 and the elastic member 410 is getting smaller to receive a shaft of a smaller diameter. Oppositely, when the adjusting member 412 is unscrewed from the bottom surface 206c, the elastic member 410 is distant from the V-shape supporting surface 208. Then, the space between the V-shape supporting surface 208 and the elastic member 410 is getting larger to receive a shaft of a longer diameter.

Figure 5A:
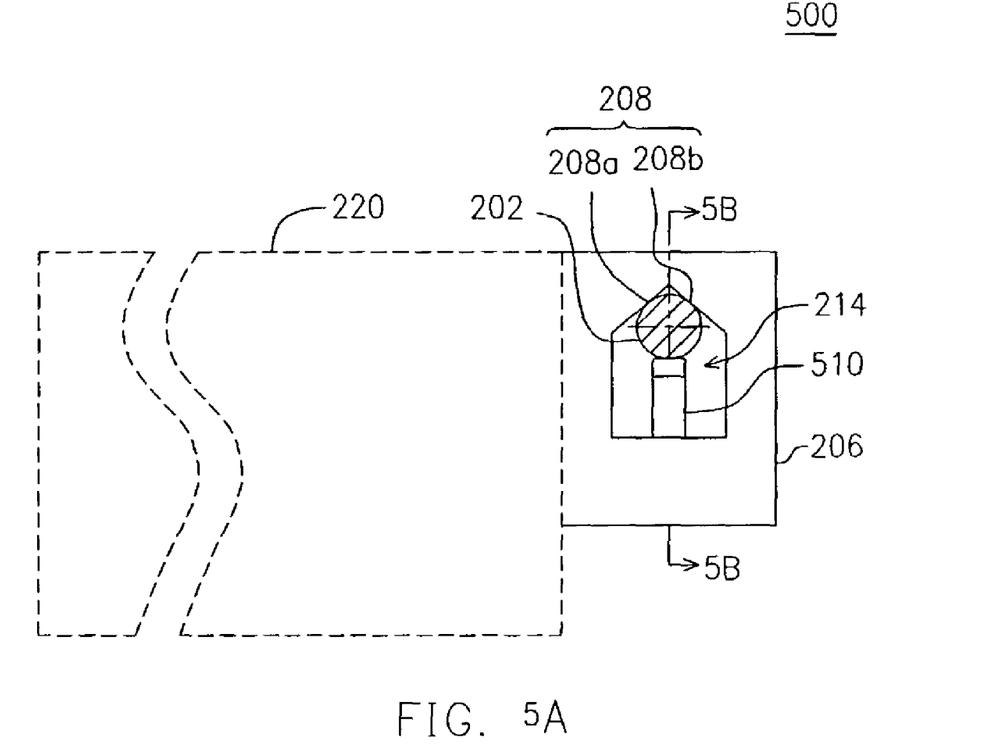
FIG. 5A is a front view of a linear guiding apparatus for a fourth embodiment of the present invention.
Figure 5B:
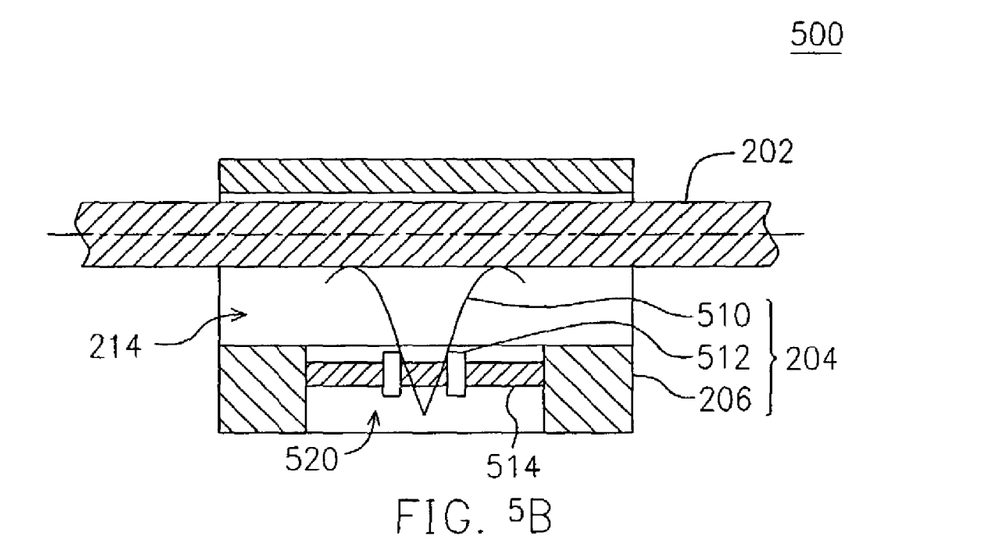
FIG. 5B is a sectional view corresponding to the cross section line 5B—5B of FIG. 5A.

FIG. 5A is a front view of a linear guiding apparatus for a fourth embodiment of the present invention. FIG. 5B is a sectional view corresponding to the cross section line 5B—5B of FIG. 5A. In FIGS. 5A, 5B, the components which are the same as those in FIGS. 2A, 2B will use the same symbols and the description about those components is omitted.

In this embodiment, the bottom surface 206c of the body 206 has an opening 520, wherein a lead screw 514 is mounted on the side-walls of the opening 520 and the lead screw 514 is paralleled the shaft 202. For this embodiment, the elastic member 510 is composed of, for example, a V-shape leaf spring which has two wings thereof. The two wings of the V-shape leaf spring have two holes respectively to be received the lead screw 514. The ends of the two wings are bent to be contacted the outer edge of the shaft 202. Moreover, the material of the V-shape leaf spring is preferably of low friction coefficient. The friction between the shaft 202 and the V-shape leaf spring is respectively low, so the shaft 202 can slide smoothly in the shaft holding apparatus 204.

The adjusting member 512 is composed of, for example, two nuts. The two nuts is mounted on the lead screw 514 and is located beside the V-shape leaf spring.

When the two nuts are screwed closely, the elastic member 510 (the V-shape leaf spring) is pushed to be close to the V-shape supporting surface 208. Then, the space between the V-shape supporting surface 208 and the elastic member 510 is getting smaller to receive a shaft of a smaller diameter. Oppositely, when the two nuts are screwed far from each other, the elastic member 510 is distant from the V-shape supporting surface 208. Then, the space between the V-shape supporting surface 208 and the elastic member 510 is getting larger to receive a shaft of a longer diameter.

Figure 6A:
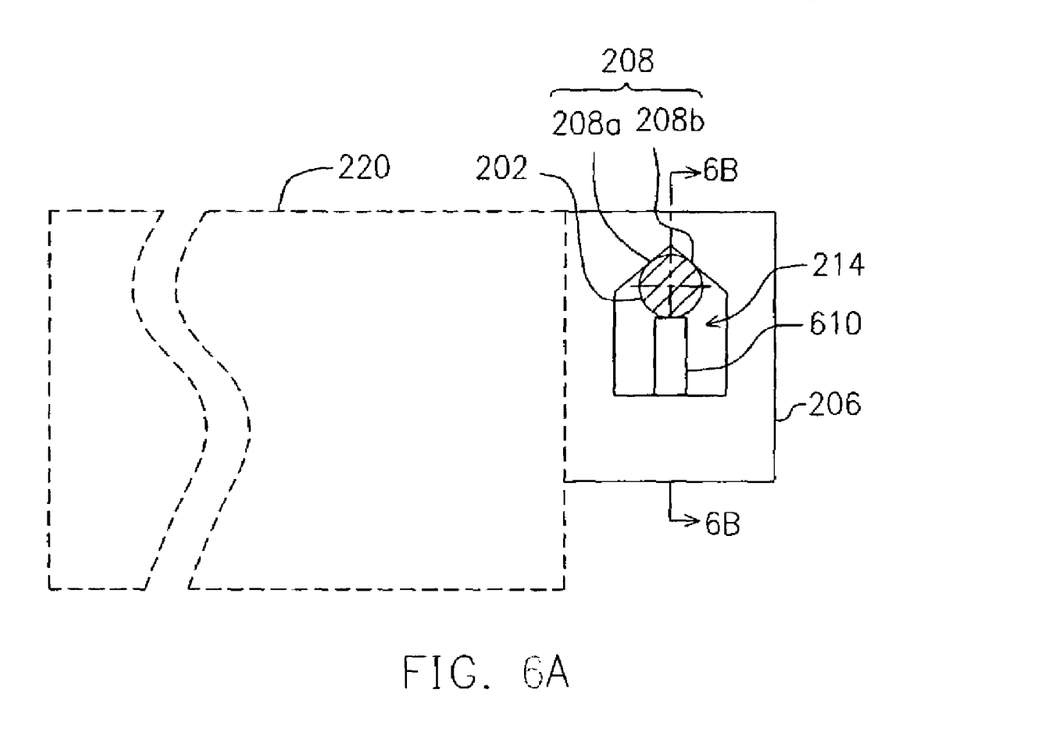
FIG. 6A is a front view of a linear guiding apparatus for a fifth embodiment of the present invention.
Figure 6B:
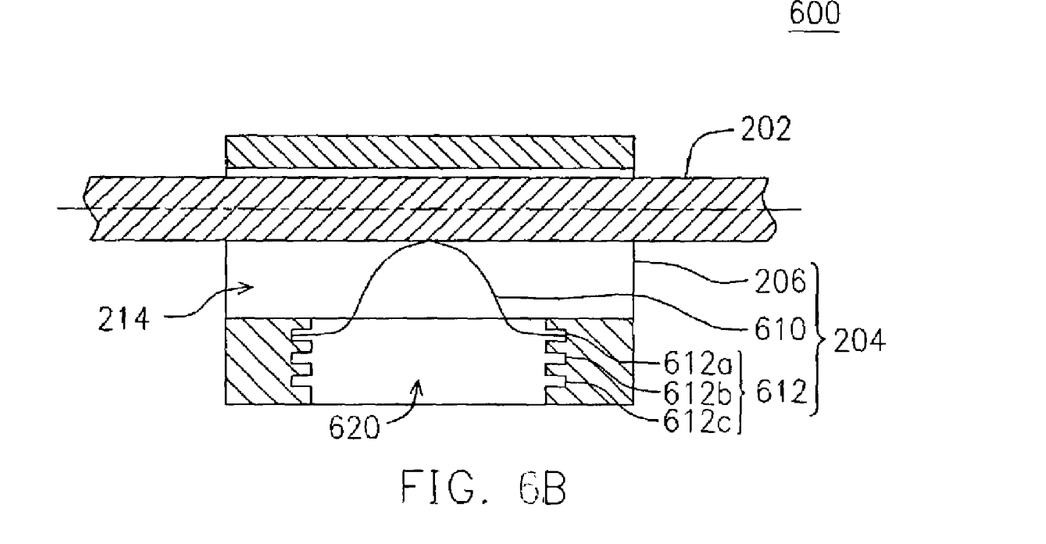
FIG. 6B is a sectional view corresponding to the cross section line 6B—6B of FIG. 6A.

FIG. 6A is a front view of a linear guiding apparatus for a fifth embodiment of the present invention. FIG. 6B is a sectional view corresponding to the cross section line 6B—6B of FIG. 6A. In FIGS. 6A, 6B, the components which are the same as those in FIGS. 2A, 2B will use the same symbols and the description about those components is omitted.

In this embodiment, the bottom surface 206c of the body 206 has an opening 620. The adjusting member 612 is composed of, for example, a plurality of orientation slot pairs 612a, 612b, 612c, wherein the orientation slot pairs 612a, 612b, 612c are formed on the two side-walls of the opening 620 respectively. The elastic member 610 is, for example, a leaf spring. The two ends of the leaf spring are inserted into one of the orientation slot pairs, so that the leaf spring is bent to make one surface of the leaf spring contacted the shaft 202. Moreover, the material of the leaf spring is preferably of low friction coefficient. The friction between the shaft 202 and the leaf spring is respectively low, so the shaft 202 can slide smoothly in the shaft holding apparatus 204.

When the leaf spring is inserted into the orientation slot pair 612a which is close to the V-shape supporting surface 208, the elastic member 610 (the leaf spring) is close to the V-shape supporting surface 208. Then, the space between the V-shape supporting surface 208 and the elastic member 610 is getting smaller to receive a shaft of a smaller diameter. Oppositely, when the leaf spring is inserted into the orientation slot pair 612c which is far from the V-shape supporting surface 208, the elastic member 610 is distant from the V-shape supporting surface 208. Then, the space between the V-shape supporting surface 208 and the elastic member 610 is getting larger to receive a shaft of a longer diameter.

Besides, in this embodiment, a plurality of leaf springs of different lengths can be insert a fixed orientation slot pair to adjust the space receiving the shaft. When a leaf spring of a longer length is used, the bent surface of the leaf spring is close to the V-shape supporting surface 208. Then, the space between the V-shape supporting surface 208 and the elastic member 610 is getting smaller to receive a shaft of a smaller diameter. Oppositely, when a leaf spring of a shorter length is used, the elastic member 610 is distant from the V-shape supporting surface 208. Then, the space between the V-shape supporting surface 208 and the elastic member 610 is getting larger to receive a shaft of a longer diameter.

Accordingly, the present invention provides a linear guiding apparatus, which has a shaft holding apparatus is clipped a shaft by the V-shaped supporting surface and the elastic member. The position of the elastic member is adjusted by the adjusting member. Therefore, the space between the V-shape supporting surface and the elastic member is adjustable. Also, the clipping force of the shaft holding apparatus is adjustable. The linear guiding apparatus is able to hold any shaft. Therefore, the linear guiding apparatus is adapted to various style of the scanner.

The linear guiding apparatus for the present invention is suitable for any shaft. Therefore, the manufacturing cost and the storage cost is decreased.

Other embodiments of the invention will appear to those skilled in the art from consideration of the specification and practice of the invention disclosed herein. It is intended that the specification and examples are to be considered as exemplary only, with a true scope and spirit of the invention being indicated by the following claims.

The invention claimed is:

1. A linear guiding apparatus, comprising:
   a shaft; and
   a shaft holding apparatus adapted to slide along the shaft,
   wherein the shaft holding apparatus comprises:

a body comprising a V-shaped supporting surface, wherein the V-shaped supporting surface is capable of supporting the shaft;

an elastic member mounted to the body, wherein the elastic member is capable of elastically contacting the shaft, and wherein the shaft is positioned between the elastic member and the V-shaped supporting surface; and an adjusting member mounted on the body, wherein the adjusting member is capable of adjusting the position of the elastic member.

2. The linear guiding apparatus according to claim 1, wherein the elastic member comprises a leaf spring.

3. The linear guiding apparatus according to claim 1, wherein the adjusting member comprises a screw.

4. The linear guiding apparatus according to claim 1, wherein the body comprises a lead screw, and wherein the elastic member and the adjusting member are mounted on the lead screw, and further wherein the elastic member comprises a leaf spring and the adjusting member comprises a nut.

5. A linear guiding apparatus, comprising:

a shaft; and a shaft holding apparatus adapted to slide along the shaft, wherein the shaft holding apparatus comprises:

a body comprises a V-shaped supporting surface, wherein the V-shaped supporting surface is along the axis of the shaft;

an adjusting member mounted on the body; and an elastic member mounted on the adjusting member, wherein the adjusting member is capable of adjusting the position of the elastic member so that the elastic member is elastically contacted to the shaft, wherein the shaft is positioned between the elastic member and the V-shape supporting surface.

6. The linear guiding apparatus according to claim 5, wherein the elastic member comprises a washer.

7. The linear guiding apparatus according to claim 5, wherein the elastic member comprises a spring.

8. The linear guiding apparatus according to claim 5, wherein the adjusting member comprises a screw.

9. The linear guiding apparatus according to claim 5, wherein the adjusting member comprises a plurality of orientation slot pairs, wherein the orientation slot pairs are formed on the body, and wherein the distance between the shaft and each of the orientation slot pairs are different, and wherein the elastic member comprises a leaf spring, and wherein the two ends of the leaf spring are inserted to one of the orientation slot pairs so that the leaf spring is bent to elastically contact the shaft.

10. A shaft holding apparatus adapted to slide along a shaft, the shaft holding apparatus comprising:

a body comprising a V-shaped supporting surface, wherein the V-shaped supporting surface is positioned along the axis of the shaft and wherein the V-shaped supporting surface is capable of supporting an outer edge of the shaft;

an elastic member mounted on the body, wherein the elastic member is elastically contacted to the outer edge of the shaft, and wherein the shaft is positioned between the elastic member and the V-shaped supporting surface; and an adjusting member mounted on the body and contacted to the elastic member, wherein the adjusting member is capable of adjusting the position of the elastic member.

11. The shaft holding apparatus according to claim 10, wherein the elastic member comprises a leaf spring.

12. The shaft holding apparatus according to claim 10, wherein the adjusting member comprises a screw.

13. The shaft holding apparatus according to claim 10, wherein the body comprises a lead screw, and wherein the elastic member and the adjusting member are mounted on the lead screw, and further wherein the elastic member comprises a leaf spring and the adjusting member comprises a nut.

14. A shaft holding apparatus adapted to slide along a shaft, the shaft holding apparatus comprising:

a body comprising a V-shaped supporting surface, wherein the V-shaped supporting surface is capable of being positioned along the axis of the shaft and further wherein the V-shaped supporting surface is capable of supporting the shaft;

an adjusting member mounted on the body; and an elastic member mounted on the adjusting member, wherein the adjusting member is capable of adjusting the position of the elastic member so that the elastic member is capable of being elastically contacted to the shaft.

15. The shaft holding apparatus according to claim 14, wherein the elastic member comprises a washer.

16. The shaft holding apparatus according to claim 14, wherein the elastic member comprises a spring.

17. The shaft holding apparatus according to claim 14, wherein the adjusting member comprises a screw.

18. The shaft holding apparatus according to claim 14, wherein the adjusting member comprises a plurality of orientation slot pairs, wherein the orientation slot pairs are formed on the body, and wherein the distance between the shaft and each of the orientation slot pairs are different, and further wherein the elastic member comprises a leaf spring, and further wherein the two ends of the leaf spring are inserted into one of the orientation slot pairs so that the leaf spring is bent to be elastically contacted to the shaft.

19. A guiding apparatus for a scanner, comprising:

a V-shaped supporting surface capable of supporting a body on a shaft, wherein the body comprises optical components;

an elastic member coupled to the body and capable of contacting the shaft; and an adjusting member capable of adjusting the position of the elastic member.

20. The guiding apparatus for a scanner of claim 19, wherein the elastic member comprises a leaf spring.

21. The guiding apparatus for a scanner of claim 19, wherein the adjusting member comprises a screw.

22. The guiding apparatus for a scanner of claim 19, wherein the elastic member is comprised of a low-friction material.

23. A guiding apparatus for a scanner, comprising:

means for supporting a body on a shaft, wherein the means for supporting a body on a shaft comprises a V-shaped surface, and wherein the body comprises optical components;

means for positioning the shaft against the V-shaped means for supporting the body; and means for adjusting the position of the means for positioning the shaft against the V-shaped means for supporting the body.

* * * * *